United States Patent [19]

Miyauchi

[11] Patent Number: 5,717,886
[45] Date of Patent: Feb. 10, 1998

[54] SEMICONDUCTOR DISK DEVICE AND MEMORY MANAGEMENT METHOD

[75] Inventor: Shigenori Miyauchi, Itami, Japan

[73] Assignee: Mitsubishi Denki Kabushiki Kaisha, Tokyo, Japan

[21] Appl. No.: 538,369

[22] Filed: Oct. 3, 1995

[30] Foreign Application Priority Data

Jun. 6, 1995 [JP] Japan ..................... 7-139494

[51] Int. Cl.$^6$ ........................................... G06F 12/00
[52] U.S. Cl. ................... 395/430; 395/481; 395/601
[58] Field of Search ............... 365/185.33; 395/430, 395/492, 601, 405, 481

[56] References Cited

U.S. PATENT DOCUMENTS

| | | | |
|---|---|---|---|
| 5,247,658 | 9/1993 | Barrett et al. | 395/601 |
| 5,404,485 | 4/1995 | Ban | 395/412 |
| 5,437,020 | 7/1995 | Wells et al. | 395/182.04 |
| 5,473,765 | 12/1995 | Gibbons et al. | 395/500 |
| 5,530,828 | 6/1996 | Kaki et al. | 395/430 |
| 5,563,828 | 10/1996 | Hasbun et al. | 365/185.33 |
| 5,572,466 | 11/1996 | Sukegawa | 365/185.33 |
| 5,586,285 | 12/1996 | Hasbun et al. | 395/430 |

*Primary Examiner*—Tod R. Swann
*Assistant Examiner*—Conley B. King, Jr.
*Attorney, Agent, or Firm*—Leydig, Voit & Mayer, Ltd.

[57] ABSTRACT

A semiconductor disk device includes an interface that connects to a host unit operating under DOS; a flash memory having at least one continuous data storage area for storing data; a control circuit that controls data input/output with the host unit through the interface and that manages addresses of the main memory, and a cache memory connected to the control circuit and accessible to the main memory through the control circuit. Data files supplied from the host unit are written in the data storage area beginning at the lowest available address and a directory entry file associated with a data file is written into the data storage area immediately following and contiguous to the data file. Additional data and directory entry files are similarly stored sequentially. Thus, the disk device can operate with a host unit transferring data in sector units but without using a file allocation table or transformation table to maintain correlation of logical sector addresses and physical sector addresses of the stored data files in the flash memory.

4 Claims, 15 Drawing Sheets

| (LSA) | (PSA) |
|---|---|
| 0 | |
| 1 | |
| 2 | |
| 3 | |
| 4 | |
| ⋮ | ⋮ |
| n−2 | |
| n−1 | |
| n | |

Sector
512 Bytes

SEMICONDUCTOR DISK DEVICE AND MEMORY MANAGEMENT METHOD

BACKGROUND OF THE INVENTION

1. Field of the Invention

The present invention relates to a semiconductor disk device, exchangeable with a hard disk drive, and a method of memory management. The semiconductor disk device operating in the DOS environment, i.e., the Microsoft Corporation's disk operating system (DOS) environment, and is equipped with a flash memory as a memory means and a controller for memory management.

2. Description of the Prior Art

Current computers are equipped with large capacity memory devices to store large programs. A typical memory device is a hard disk drive which is categorized as a magnetic memory device. Typically the hard disk is inexpensive and readily available in a large memory capacity however, it consumes a large amount of power and makes a lot of noise because of its motor, it is large and heavy, and has a low vibration tolerance. Therefore, the most suitable applications for the hard disk drive are desktop personal computers that are not portable and certain types of laptop computers. Portable information terminals such as personal electronic notebooks and the like, however, require memory devices of low power consumption because they operate through battery power. The memory devices used in this kind of application plication should also be lightweight, durable, inexpensive, and able to provide a large memory capacity.

A semiconductor disk device using a flash memory can be used for this application, although a flash memory is more expensive than the hard disk drive mentioned above. The conventional semiconductor disk device operates by simulating the aforementioned magnetic memory device. Therefore, it reads data from and writes data to a host unit such as a personal computer (referred to as PC hereafter) or a portable information terminal in units of 512 Bytes.

The following is an explanation of a conventional semiconductor disk device as well as of the memory management and the data processing scheme inside the device. FIG. 13 shows a general block diagram of a conventional semiconductor disk device. As illustrated in the figure, a semiconductor disk device 100 comprises an interface circuit 101, a central processing unit (CPU) 102, a logical sector/physical sector address conversion table (hereafter referred to as a conversion table) 103, a flash memory 104, a flash control circuit 105, and a sector buffer for data input and output (hereafter referred to as a sector buffer) 106.

A host unit 110, such as a portable information terminal, is connected to the CPU 102 of the semiconductor disk device through interface circuit 101. CPU 102 is coupled to conversion table 103 and flash control circuit 105, and the flash control circuit 105 is connected to the flash memory 104 and the sector buffer 106.

Interface circuit 101 handles data input and output with the host unit connected to semiconductor disk device 100. CPU 102 performs the address data and memory management inside semiconductor disk device 100. Conversion table 103 relates the logical sector address (LSA) sent from host unit 110 to the physical sector address (PSA) used inside semiconductor disk device 100. Flash control unit 105 controls relatively simple read and write operations to and from flash memory 104. The sector buffer is used when data is input to and output from flash memory 104.

The flash memory 104 is a non-volatile memory which is electronically writable and erasable. Erasure of data is accomplished in erasure block units. Overwriting on the same address is forbidden.

Typically, a semiconductor disk device 100 includes a few to a few tens of flash memory chips. FIG. 14 shows the inner structure of flash memory 104, including a plurality of erasure blocks 121. The flash memory is erased only in unit of multiples of a few to a few tens of kBytes. Erasure block 121 indicates the minimum unit by which the flash memory is erased. For example, if a flash memory of 16 Mbits includes erasure blocks 121 of 64 kBytes, flash memory chip 120 includes 32 erasure blocks.

In the case of the hard disk drive operating with a PC under DOS, memory of 512 Bytes is called a sector, and a group of a few sectors is referred to as a cluster. Data is processed by the cluster. A file allocation table (FAT) manages the clusters. The name of the data, the date of storage, the size, and subdirectory information are stored in the directory entry area in the hard disk and are rewritten every time the data is updated. However, since the semiconductor disk device using flash memory has an upper limit in the number of its writing operations it can perform without failure, the FAT and the directory entry area will quickly exceed the upper limit in writing and erasing operation if the semiconductor disk device performs the same data processing as does the hard disk drive.

Consider, for example, the semiconductor disk device employing a flash memory having blocks of 64 kBytes. When one overwrites part of the data in an erasure block, one must first move the valid data in the erasure block to another erasure block, then erase the entire erasure block, and finally rewrite the moved data and the updated data in the erased erasure block. With this method, however, the number of erasing operations would accumulate rapidly and soon exceed the upper limit. The conventional semiconductor disk device overcomes this limitation by using conversion table 103.

FIG. 15 shows an example of the internal configuration of the conversion table 103. As shown in the figure, the conversion table 103 relates the LSA used by the host unit 110 to the PSA used by semiconductor disk device 100 for data management therein. While the LSA is fixed, the PSA can be freely reassigned by the CPU 102 of semiconductor disk device 100. For that reason the column for PSA is left blank.

Thus, conversion table 103 allows the semiconductor disk device to store data in arbitrary areas of flash memory 104 independent of the LSA that the host unit 110 provides. Conversion table 103 is frequently rewritten and hence it comprises SRAM or DRAM. The memory capacity of the conversion table 103 needed for a semiconductor disk device of 20 MBytes, for example, is approximately 80 kBytes.

FIG. 16 shows the configuration of erasure block 121 of an the flash memory 104 used for a conventional semiconductor disk device. The block information such as the number of block erasures is stored in an erasure block information storage area 130. As conversion table 103 is made of a volatile memory, the contents of conversion table 103 are lost when the power to semiconductor disk device 100 is disconnected. LSA data associated with each PSA is stored in a LSA storage area 131 of erasure block 121, which is a non-volatile memory area, and conversion table 103 is reconstructed by reading all the data stored in the LSA storage areas 131 when the power is restored in semiconductor disk device 100. Areas denoted by 132 are data storage areas.

FIG. 17 shows the conventional divided data management. In the figure, a hatched portion indicates the data. Because the DOS reads and writes the data in units of sectors, the data exceeding 512 Bytes is divided into multiple sectors. The divided data is managed by the FAT resident in the disk drive. Therefore, in the conventional hard disk drive and the semiconductor disk device the data of both 500 Bytes and 10 Bytes, for example, requires the same size memory areas defined by the cluster in order to store them under in the DOS environment.

FIG. 18 shows the read operations of the conventional hard disk drive. The read and write operation are described with reference to the figure. In FIG. 18, consider the case where a user wants to read the data, "AAA.TXT", from the hard disk drive. The host unit reads directory entry area 140 in the hard disk drive and searches the data, "AAA.TXT". Directory entry area 140 contains file names and the cluster numbers assigned to those files. In the present example the host unit obtains the cluster number "3" from directory entry area 140 and retrieves the data "a" stored in data area 142.

The part of the FAT 141 associated with the cluster number "3", contains the number "4" which indicates the next data is stored in the cluster number "4". Thus, the read operation continues until the number "FFFF" is read, which indicates the end of the data series. The host unit has now retrieved the file, "AAA.TXT", which consists of the series of data a, b, c, and d.

FIG. 19 is a schematic diagram showing an address conversion demonstrating the LSA/PSA conversion in a read operation in a conventional semiconductor disk device 100. This conversion operation must always be carried out when data (including FAT) is read from semiconductor disk device 100.

Consider the case where host unit 110 wants to read data from LSA "2". The CPU 102 can retrieve the data from the PSA "4", referring to conversion table 103 in semiconductor disk device 100. Thus, in this example, CPU 102 reads the data "b" from flash memory 104.

FIG. 20 is a schematic diagram showing the address conversion demonstrating the LSA/PSA conversion in a write operation in a conventional semiconductor disk device 100. In the figure, the CPU 102 first checks whether or not there is an empty area in flash memory 104 to write the data. If it finds one, it writes the data there and updates the conversion table.

Consider the case where host unit 110 wants to write the data "d" in LSA=11. CPU 102 selects a PSA area, for example PSA=2, out of empty PSA areas (PSA=0–2, 5, 7–11) of flash memory 104 and writes the data "d" in data storage area 132 of the PSA=2. Simultaneously CPU 102 writes "11" in LSA storage area 131 (see FIG. 16) of the PSA area 2 of flash memory 104, and writes "2" in the PSA of conversion table 103 associated with LSA=11.

FIG. 21 is a schematic diagram showing the address conversion demonstrating the LSA/PSA conversion in an overwrite operation in a conventional semiconductor disk device 100. For example, if host unit 110 requests an overwrite of the data "b1" in LSA=2 in the figure, the CPU 102 first selects an empty PSA area, for example PSA=5, out of PSA areas 0–2, 5, 7–11 and stores the data "b1" in data storage area 132 (see FIG. 16) of the PSA=5 of flash memory 104. Simultaneously the CPU 102 writes "2" in LSA storage area 131 of the PSA=5 of flash memory 104, and writes "5" in the PSA of conversion table 103 associated with LSA=2.

Thus, the data to be overwritten in flash memory 104 remains intact. The data is erased when the data areas become scarce. This procedure is followed in order to minimize the number of erasures. Block erasure of flash memory 104 is performed after the valid data stored in the block to be erased is moved to an empty block, and then the conversion table is updated. In the explanation above, with reference to FIGS. 19 through 21, the functions of flash control circuit 105 and sector buffer 106 were not described to avoid confusion.

SUMMARY OF THE INVENTION

Conventional semiconductor disk devices generally have one drawback; namely that the data management performed with the sectors requires a large memory. For example, a semiconductor disk device having a 20 MBytes capacity needs 40960 sectors, which is obtained from:

20 MBytes÷512 Bytes=40960 sectors. The number of bits necessary to distinguish 40960 sectors is obtained from:

$$ln 40960 ÷ ln 2 = 15.3.$$

That is, 16 bits are needed. Therefore, the total memory needed for the conversion table is:

$$40960 \times 16 = 80 \text{ kBytes.}$$

Accordingly, for a semiconductor disk device of 80 MBytes, the conversion table must have 360 kBytes of memory; for a semiconductor disk device of 160 MBytes the size of the conversion table would be 760 kBytes (about 2.5 Mbits). Further, the same reasoning applies to the LSA storage area of the flash memory, and, hence, the LSA storage area requires the same amount of memory as the conversion table. Consequently, there is a problem in implementing a larger semiconductor disk device as well as the higher cost of such a device.

Thus, a object of the present invention is to provide a semiconductor disk device operating in the DOS environment that provides a suitable way for the flash memory to manage data more efficiently than a conventional semiconductor disk device that exactly simulates the magnetic disk drive and to create suitable method for data management.

The present invention provides a semiconductor disk device, which operates under DOS, comprising interface means that connects to a host unit operating under DOS; a main memory comprising a block-erasure type flash memory which has at least one continuous data storage area to store data; control means that controls data input/output with the host unit through the interface and performs the address, data and memory management for the main memory; and a cache memory used between the control means and the main memory.

In one exemplary embodiment of the present invention, the control means, every time a data file is stored in the main memory, provides an extended directory entry area just after the latest data file having been stored and stores directory entry files of all of the data files stored in the main memory and starting addresses of them in the extended directory entry area, and is able to retrieve the desired data in the main memory by means of the starting address.

In another exemplary embodiment of the present invention, the control means stores the directory entry data in the extended directory entry area before storing the starting address therein.

The present invention provides a method of memory management for semiconductor disk devices, which operate under DOS and use flash memory as the main memory, comprising the following steps: providing a continuous data storage area in the main memory for storing data; for writing, identifying the type of data sent from the host unit by means of the LSA also sent from the host unit and writing the data continuously in the data storage area of the main memory in accordance with the type of data identified; and reading designated data by means of the LSA sent from the host unit for reading data.

In one exemplary embodiment of the present invention the method of memory management comprises the following steps: providing an extended directory entry area just after the latest data file having been stored in the main memory, storing directory entry files of all of the data files stored in the main memory and the starting addresses of them in the extended directory entry area continuously, every time the data file is stored in the data storage area, and retrieving the desired data in the main memory by means of the starting address.

In another exemplary embodiment of the present invention the method of memory management comprises the step of storing the directory entry data in the extended directory entry area before storing the starting address.

The control means of the semiconductor disk device of the present invention identifies the type of data sent from the host unit by means of the LSA, also sent from the host unit, and reads and writes the data continuously in the data storage area of the main memory without using a FAT.

In the semiconductor disk device of the present invention, every time a data file is stored in the main memory, the control means provides and updates the extended directory entry area that stores the directory entry file of the data file stored in the main memory and the starting address thereof and that continuously follows the area storing the data file, and is able to retrieve the desired data from the main memory by means of the starting address.

In the semiconductor disk device the present invention, the control means stores the directory entry data in the extended directory entry area before storing the starting address therein.

According to the memory management method of the present invention, a continuous data storage area is provided in the main memory for storing data; the type of data sent from the host unit is identified by means of the LSA, which is also sent from the host unit; and the data is written in or read from the data storage area in the main memory without using a FAT.

The memory management method of the present invention includes, in addition to the above memory management method, the following steps: providing and updating the extended directory entry area that stores the directory entry file of each stored data file and the starting address thereof and that continuously follows the area storing the data file every time the data file is stored in the data storage area, and retrieving the desired data in the main memory by means of the starting address.

The memory management method of the present invention includes, in addition to the above memory management method, the step of storing the directory entry data in the extended directory entry area before storing the starting address.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

The present invention is described below in detail with reference to the exemplary embodiments and the accompanying drawings.

First Embodiment

Figure 1:
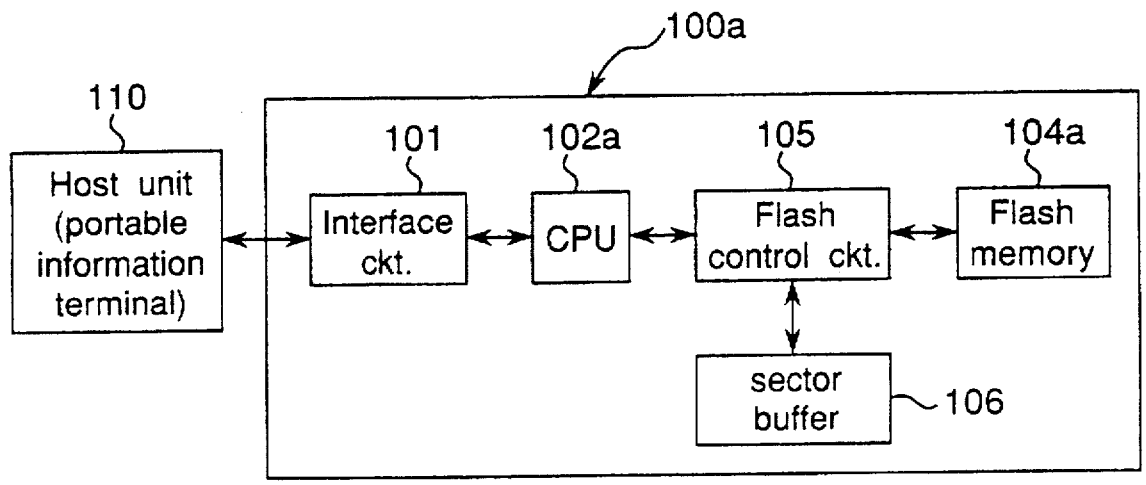
FIG. 1 shows a schematic block diagram of a semiconductor disk device used in the present embodiment.
Figure 13:
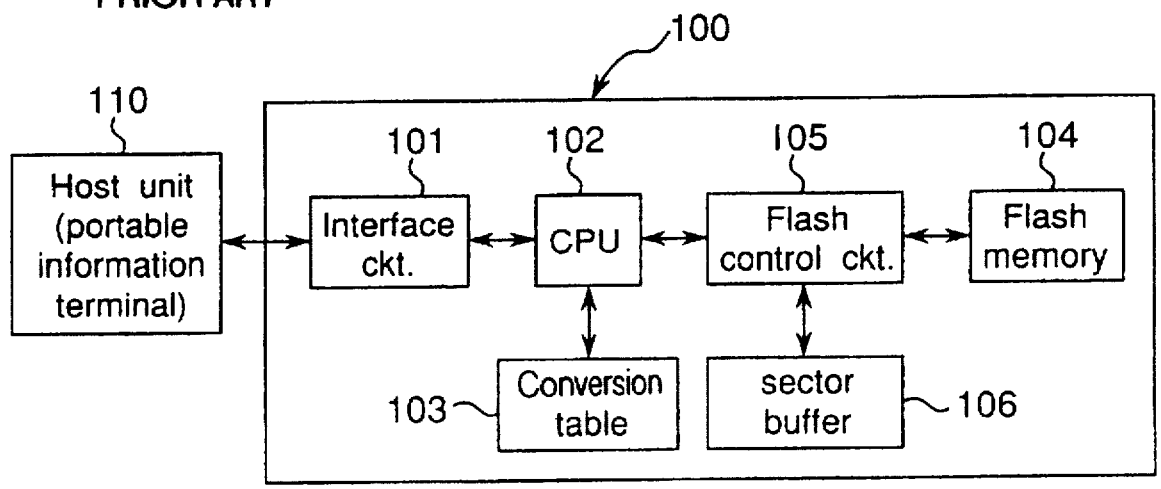
FIG. 13 shows a schematic block diagram of a conventional semiconductor disk device.

FIG. 1 shows a schematic block diagram of the exemplary semiconductor disk device used in the present embodiment. The same components as those shown in FIG. 13, which illustrates a conventional semiconductor disk device, are denoted with the same numerals, and the descriptions of those components are not given. Only the points that differ from FIG. 13 are described below. The major difference between FIG. 1 and FIG. 13 is that FIG. 1 does not include the conversion table 103 of FIG. 13. Hence, since the usable memory of the flash memory in FIG. 1 is larger than that in FIG. 13, the flash memory in FIG. 1 is denoted as 104a. The CPU in FIG. 1 is also denoted as 102a. Accordingly, the semiconductor disk device in FIG. 1 is denoted as 100a to emphasize its difference from FIG. 13.

In FIG. 1 the semiconductor disk device 100a comprises interface circuit 101, CPU 102a, flash memory 104a, flash control circuit 105, and sector buffer 106.

Host unit 101 is connected to CPU 102a through interface circuit 101 of semiconductor disk device 100a. The CPU 102a is coupled to flash control circuit 105 which, in turn, is connected to flash memory 104a and sector buffer 106.

Interface circuit 101 exchanges data with host unit 110 that is connected to semiconductor disk device 100a. The CPU 102a manages the address data and memory of the semiconductor disk device 100a. Flash control circuit 105, in place of CPU 102a, controls the relatively simple tasks of reading data to and writing data from flash memory 104a. Flash memory 104a reads or writes data in units of 8 bits or 16 bits only. In the DOS environment, however, it must exchange data with host unit 110 in units of 512 Bytes. Sector buffer 106, therefore, is used as a cache memory between the CPU 102a and flash memory 104a.

CPU 102a determines and controls the base addresses which are used when sector buffer 106 and flash memory 104a read and write data. Flash control circuit 105, in place of CPU 102a, increments and decrements the base addresses of flash memory 104a and sector buffer 106 for reading and writing data between them.

When flash memory 104a is a command control type flash memory, flash control circuit 105 specifies an address of the flash memory, outputs either a write pulse for writing or a read pulse for reading, and then writes or reads data at the specified address.

Figure 14:
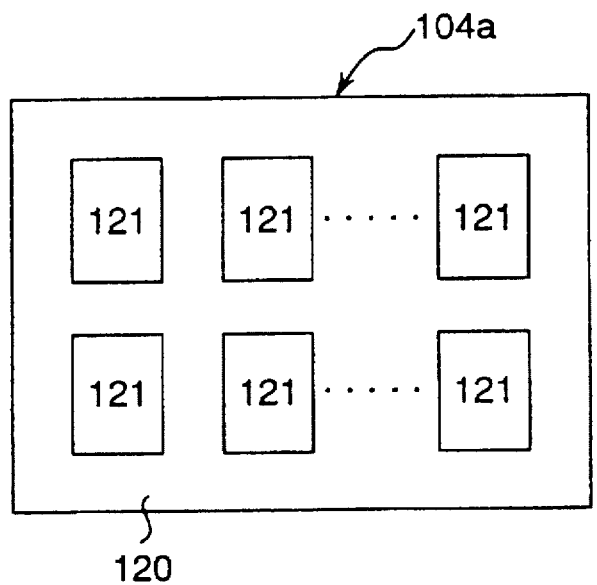
FIG. 14 shows the inner structure of flash memory 104 used in the device shown in FIG. 13.

Flash memory 104a is a non-volatile memory electrically erasable and writable as described above. Erasure of data stored in the flash memory is performed on an entire erasure block and overwrite is not possible. The inner structure thereof is the same as that shown in FIG. 14. Hence, the detailed explanation of flash memory 104a is not given below. Interface circuit 101 functions as interface means; CPU 102a and flash control circuit 105, as control means; flash memory 104a, as the main memory; and sector buffer 106, as a cache memory.

Figure 2:
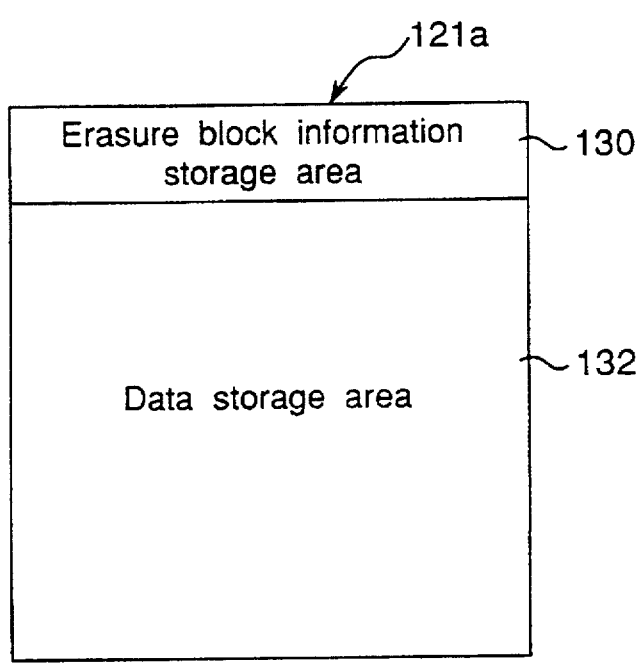
FIG. 2 shows the inner structure of an erasure block of the flash memory used in the semiconductor disk device in FIG. 1.

FIG. 2 shows the structure of erasure block 121a of the flash memory used for the semiconductor disk device in the present embodiment of the present invention. In FIG. 2 the same components as those shown in FIG. 16, which illustrates a conventional erasure block, are denoted with the same numerals, and the descriptions of those components are not given. Only the differing points from FIG. 16 are described below.

Figures 15, 16:
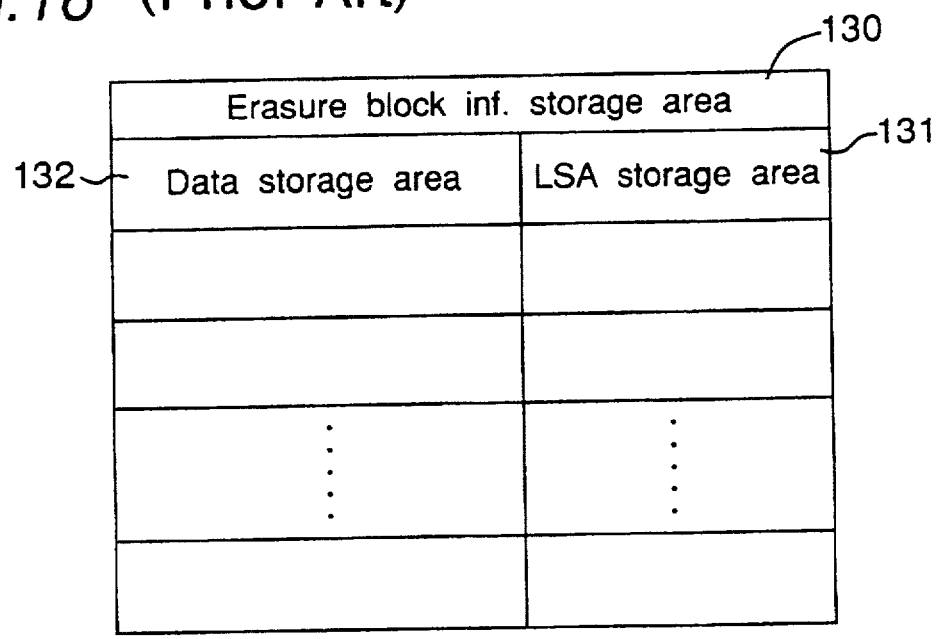
FIG. 15 shows the inner structure of the conversion table of the device used in FIG. 13.
FIG. 16 shows the structure of the erasure block 121 of the flash memory 104 used in the device shown in FIG. 13.
Figure 17:
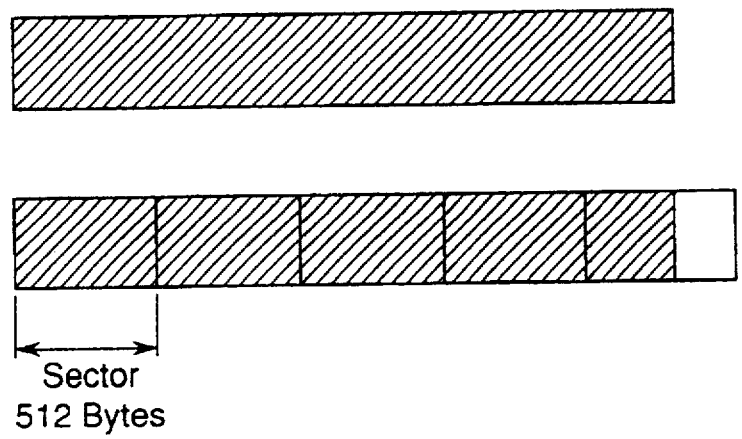
FIG. 17 shows the conventional divided data management.
Figure 18:
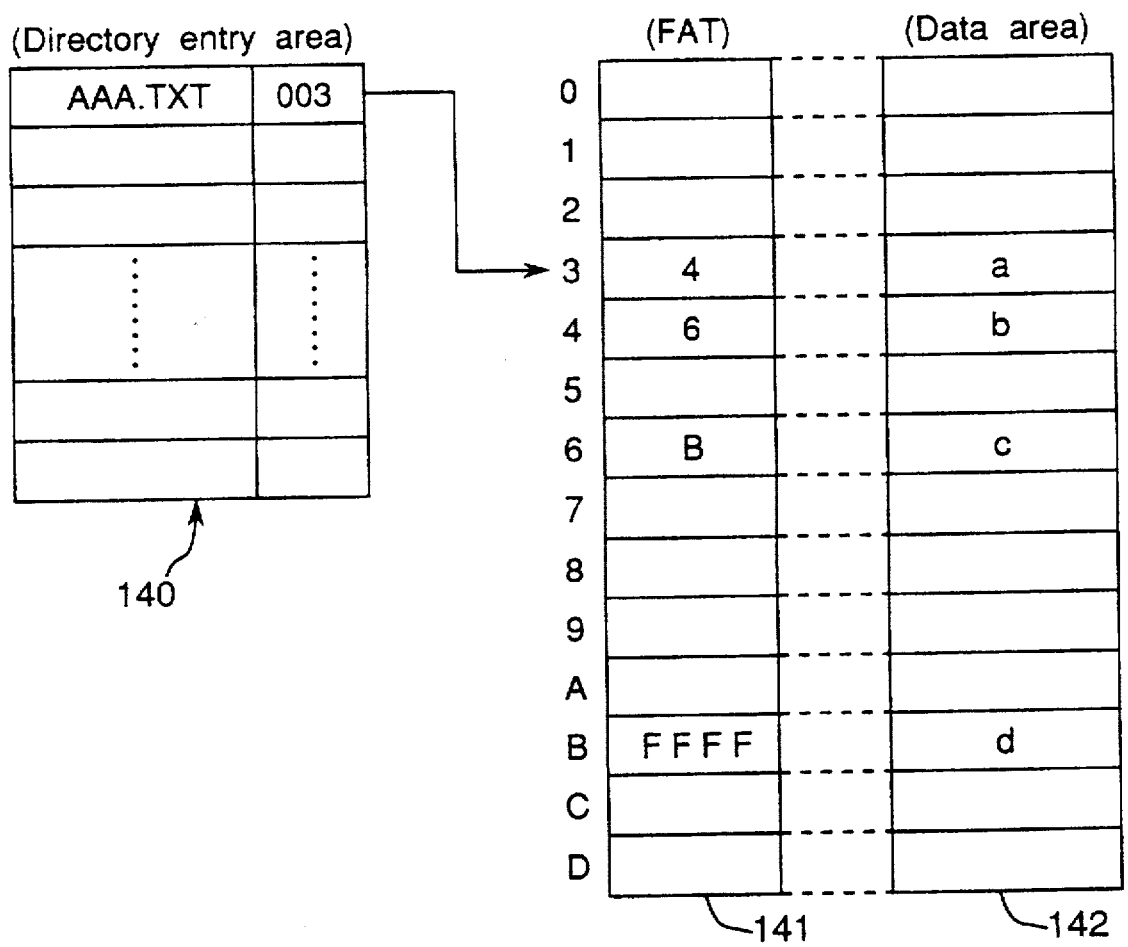
FIG. 18 demonstrates the operation of a conventional hard disk drive in reading data.
Figure 19:
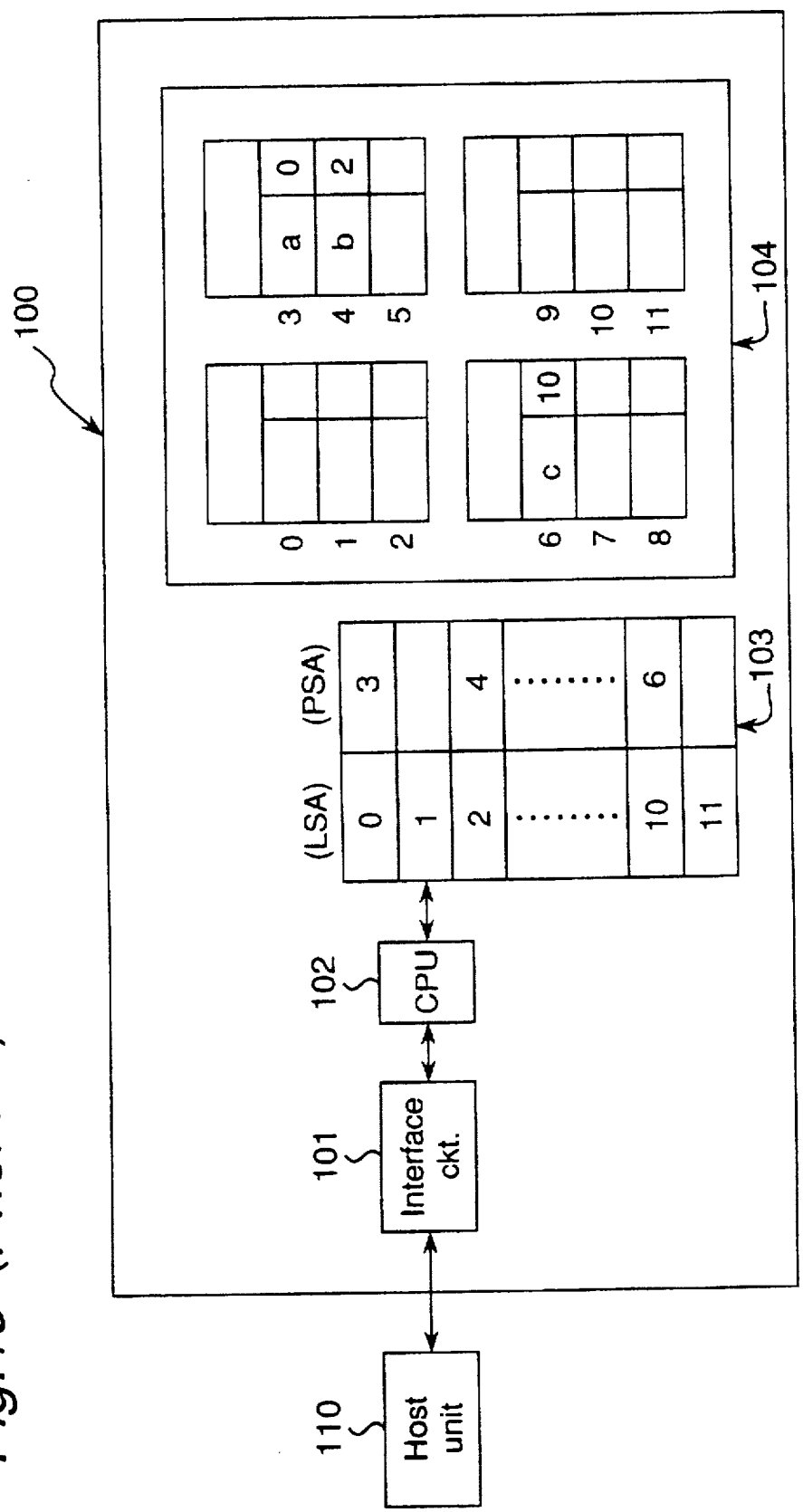
FIG. 19 shows the address conversion portion of the LSA/PSA conversion operation in conventional data reading.
Figure 20:
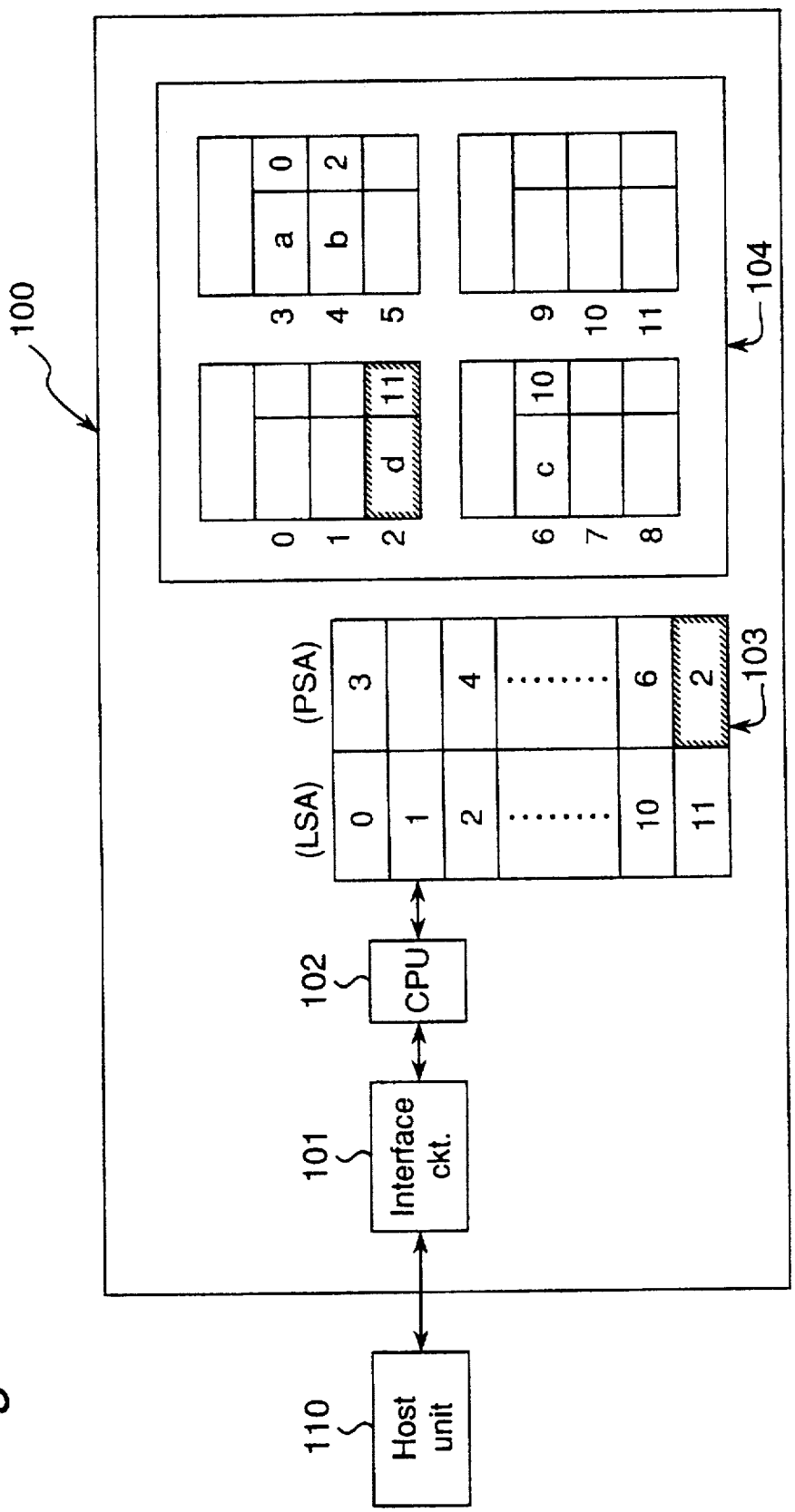
FIG. 20 shows the address conversion portion of the LSA/PSA conversion operation in conventional data writing.
Figure 21:
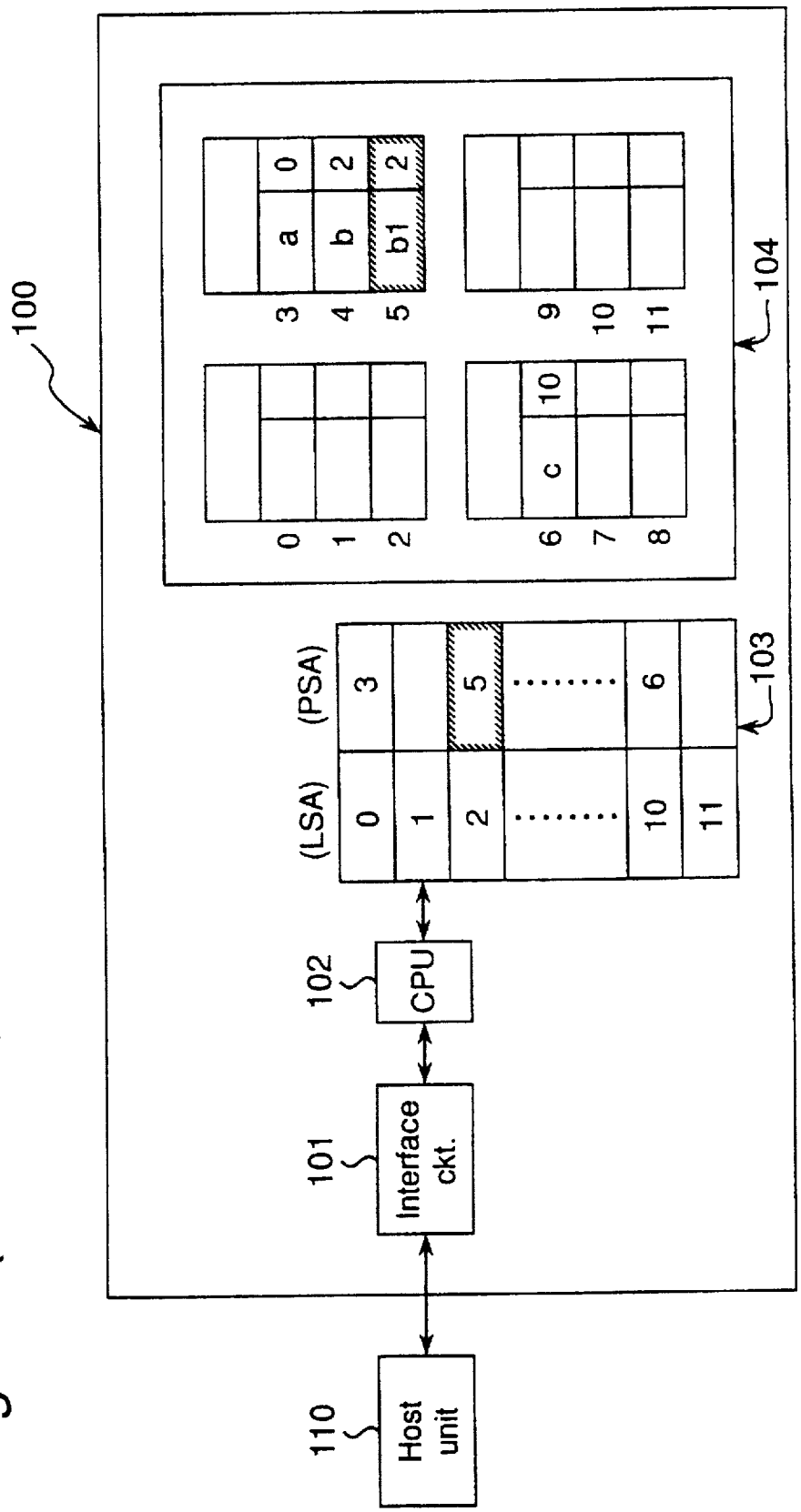
FIG. 21 shows the address conversion portion of the LSA/PSA conversion operation in data overwriting.

The difference between FIG. 2 and FIG. 16 is that FIG. 2 does not have the LSA storage area 131 of FIG. 16. The structure of FIG. 2 includes only erasure block information storage area 130 and data storage area 132.

Erasure block information storage area 130 is used for storing the total number of block erasures that have been made up to the present time. The current upper limit for the number of erasures of a flash memory is on the order of 100 thousand. Therefore, three bytes will be sufficient for erasure block information storage area 130 to store the total number of erasures. Further, erasure block information storage area 130 may also store data that is, for some reason, forbidden to be used.

FIGS. 3–6 are schematic diagrams showing the write operation to semiconductor disk device 100a shown in FIG. 1. The write operation, according to the present invention, is described in detail below with reference to those drawings.

The same components as those shown in FIG. 1 are denoted with the same numerals, and the descriptions of those components is not given.

Figure 3:
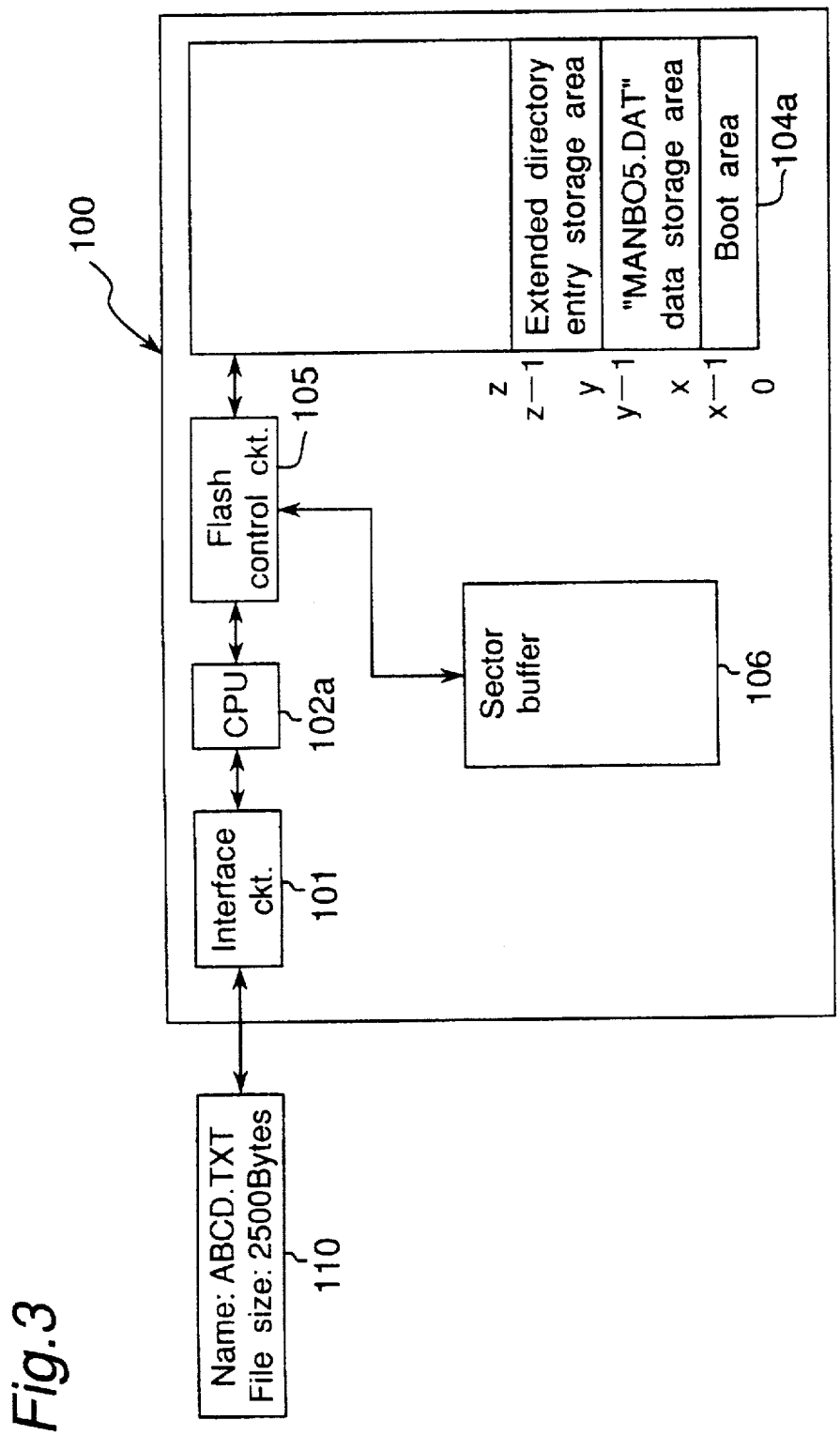
FIG. 3 shows the operation of writing data to the semiconductor disk device of FIG. 1.

Consider the case, as shown in FIG. 3, where the data called "ABCD.TXT" and having 2500 Bytes is to be written to semiconductor disk device 100a of the present invention. Further, suppose that flash memory 104a of semiconductor disk device 100a contains the data called "MANBO5.DAT" and having 1000 Bytes in the data storage area.

The addresses 0–(x–1) of flash memory 104a are secured as a boot area where the start-up data is stored. The start-up data is used by host unit 110 to start up the system from semiconductor disk device 100a and hence the start-up data must be stored in the specific area that corresponds to a specific LSA. Generally, the boot area must be in LSA=0.

Figure 7:
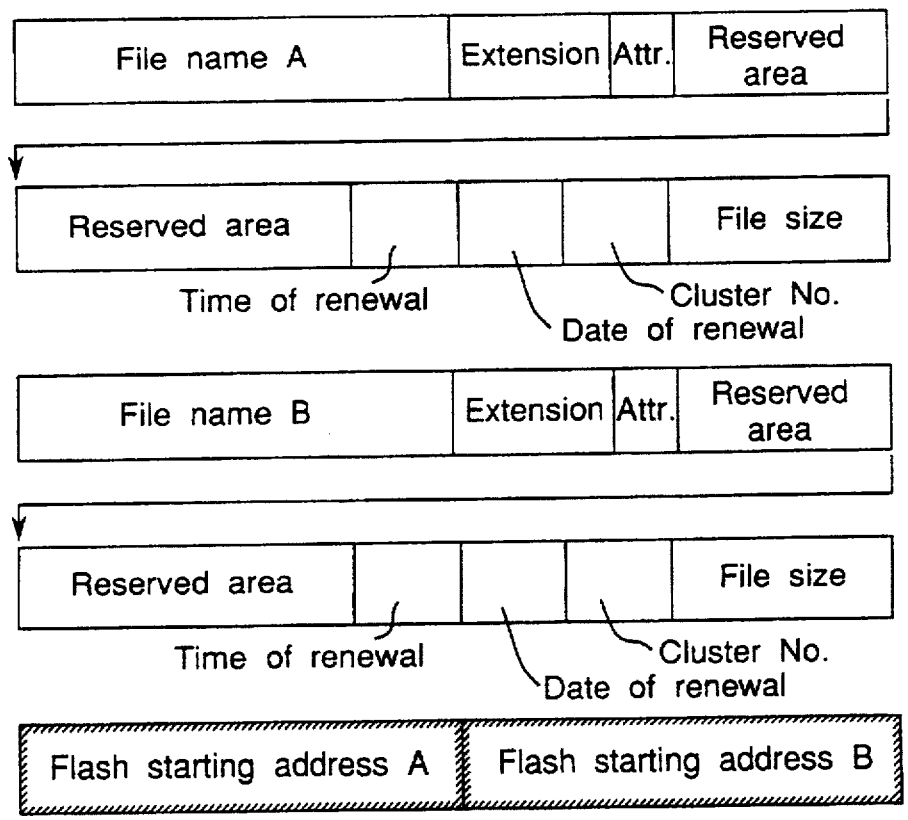
FIG. 7 shows the inner structure of an extended directory entry area.

Now assume that the file "MANBO5.DAT" occupies the address x–(y–1) of flash memory 104a. If an address of flash memory 104a is 8 bits, the address (y–1) is the address x plus 999. If the address is 16 bits, the address (y–1) is the address x plus 499. The area which ranges from the address y to z–1 of the flash memory is allocated to an extended directory entry area, which is an extended area of the conventional directory entry area. FIG. 7 shows the internal structure of the extended directory entry area.

As shown in FIG. 7, the extended directory entry area includes the start address of the flash memory 104a for each file in addition to the same directory information for the file as contained in the conventional directory entry area. The conventional directory entry area has 32 Bytes, which consist of file name (8 Bytes), extension (3 Bytes), attribute (1 Byte), time of renewal (2 Bytes), date of renewal (2 Bytes), start cluster number (2 Bytes), file size (4 Bytes), and reserved area (10 Bytes). The extended directory entry area also includes the above information for each file.

The conventional directory information for all the files is stored first and then the aforementioned start addresses of the flash memory for those files are added. This configuration is used because, in some cases, DOS seeks a file name by a unit of 32 Bytes. A flash memory that is configured so that one address corresponds to 16 Bytes and that has the capacity of 20 MBytes, for example, has the addresses 0–1,048,576. Therefore, the memory needed to store the start address of the flash memory is only 3 Bytes.

In FIG. 3 the data "ABCD.TXT" is divided into five sectors and sent to semiconductor disk device 100a because the data comprises 2500 bytes and there are 512 per sector as shown by;

2500÷512=4.88≈5.

Figure 4:
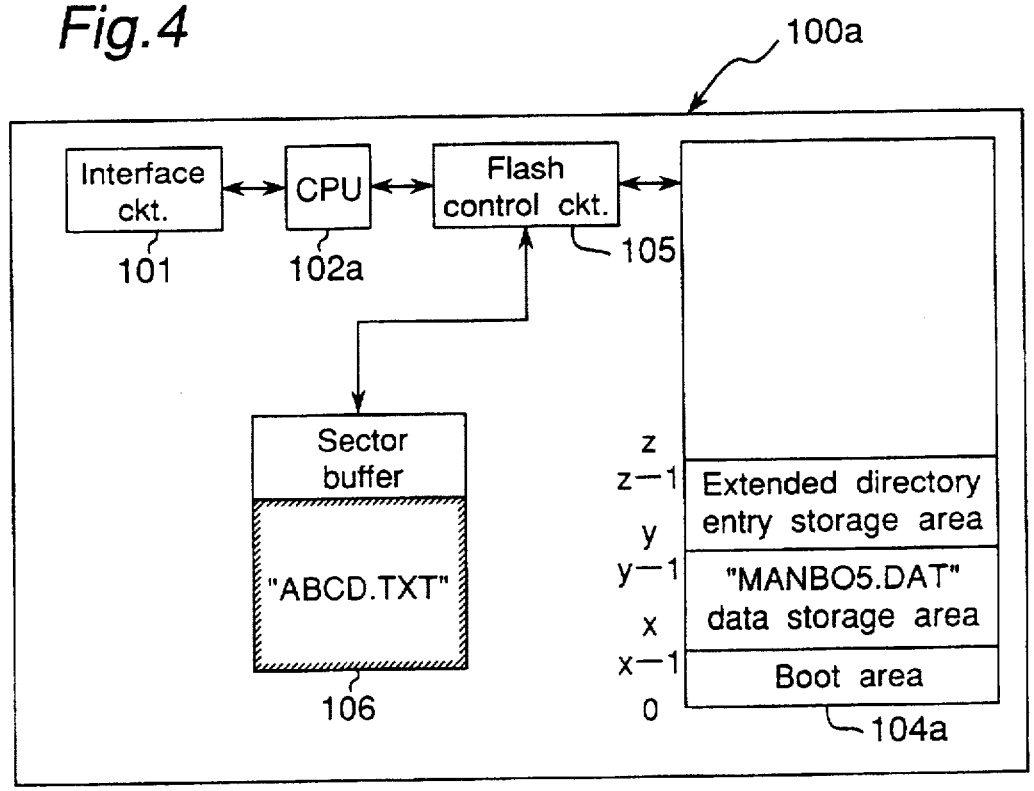
FIG. 4 shows the operation of writing data to the semiconductor disk device of FIG. 1.

Further, the data is transferred to sector buffer 106 through interface circuit 101, CPU 102a, and flash control circuit 105 as shown in FIG. 4.

The data is divided into five sectors of 512 Bytes each. If the semiconductor disk device 100a has the capability to accept all the data as one unit, the host unit 110 sends all the data to sector buffer 106 in one lot. If it does not have that capability, however, the host unit 110 sends one sector at a time to sector buffer 106, which then, in turn, transfers the data to flash memory 104a through the flash control circuit 105, and this process repeats until all the sectors are sent to semiconductor disk device 100a. Since flash memory 104a reads or writes data in units of 8 or 16 bits, flash control circuit 105 is used when data of 512 Bytes is read from or written in flash memory 104a.

Figure 5:
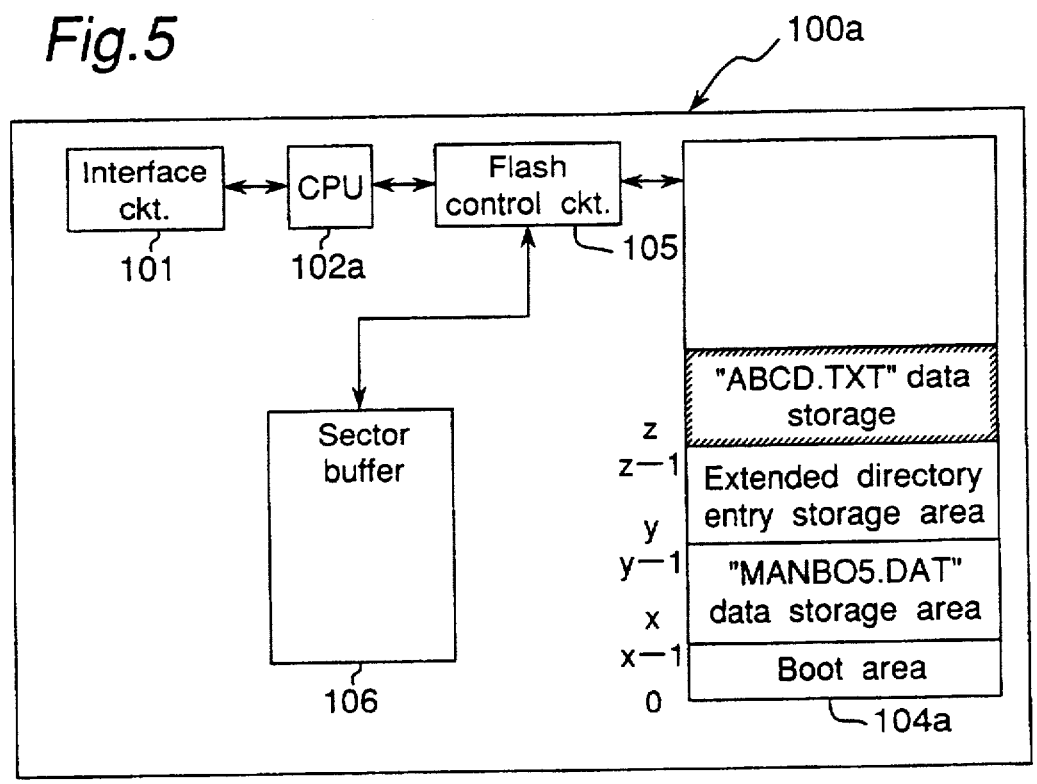
FIG. 5 shows the operation of writing data to the semiconductor disk device of FIG. 1.
Figure 6:
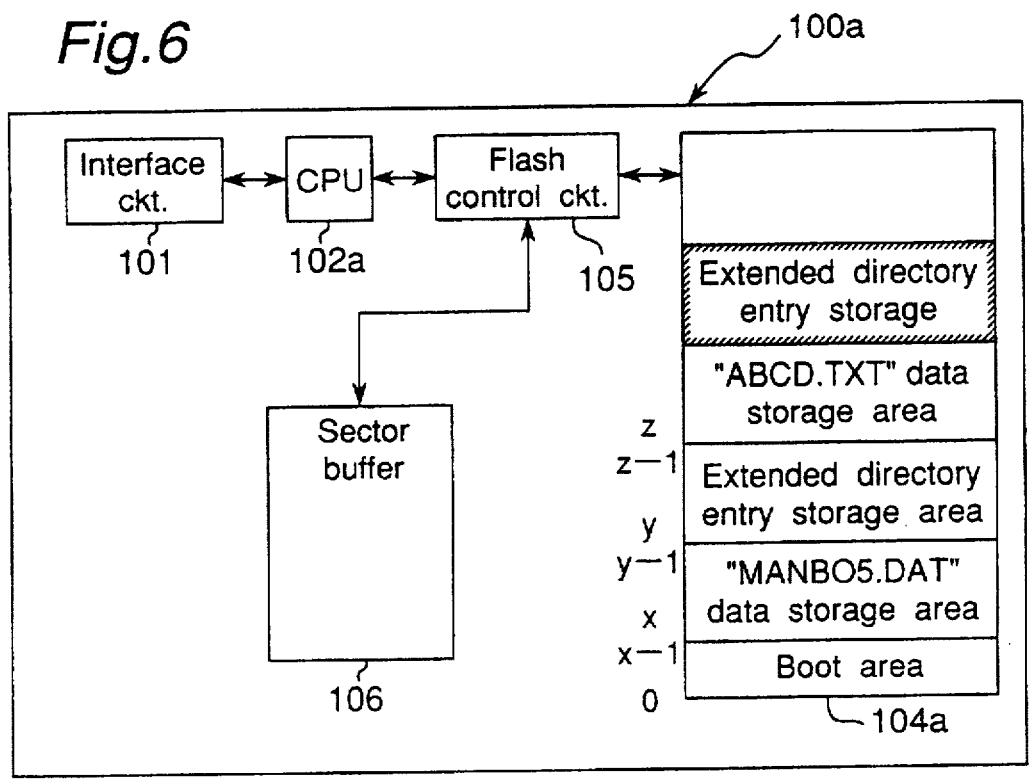
FIG. 6 shows the operation of writing data to the semiconductor disk device of FIG. 1.

Next, the data is written starting at the address z of flash memory 104a as shown in FIG. 5. Then the updated extended directory entry area is written starting at the very next address following the last address of the area storing the data as shown in FIG. 6. No data in flash memory 104a is stored at addresses higher than those for the extended directory entry area. In FIGS. 4-6, the host unit 110 is not included in order to simplify the explanation. Thus, in storing the data in semiconductor disk device 100a, host unit 110 has semiconductor disk device 100a write the data, update the directory information of the directory entry area, and also update the FAT.

Next, updating of the FAT is described below. Since, in the semiconductor disk device 100a of the present invention, data is written in continuous data storage area 132 of flash memory 104a, a FAT is no longer necessary. The semiconductor disk device 100a of the present invention must be compatible with both conventional semiconductor disk devices and hard disk drives in the input and output of data. Therefore the, CPU 102a disregards the FAT and does not store it in the flash the memory 104a.

The Semiconductor disk device 100a of the present invention reads the data requested from the host unit 110 based on the flash starting address in the extended directory entry area. When the host unit 110 requests data to be sent in units of 512 Bytes, the semiconductor disk device 100a can output the data by sending it in units of 512 Bytes from flash memory 104a through flash control circuit 105.

Next, described below in detail is the function of the CPU 102a in the read and write operation.

Figure 8:
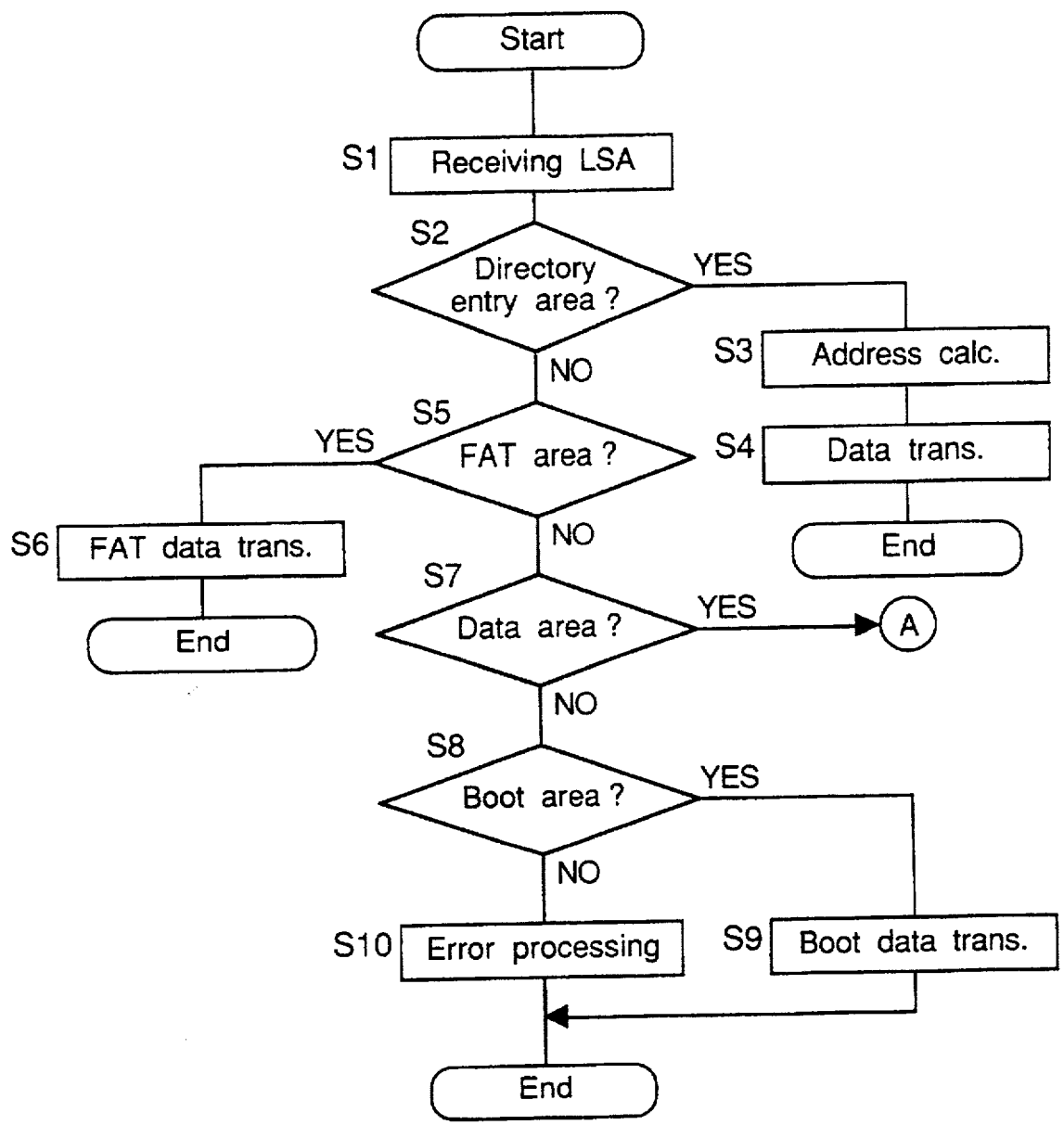
FIG. 8 is a flow chart showing the operation of CPU 102a in reading data.
Figure 9:
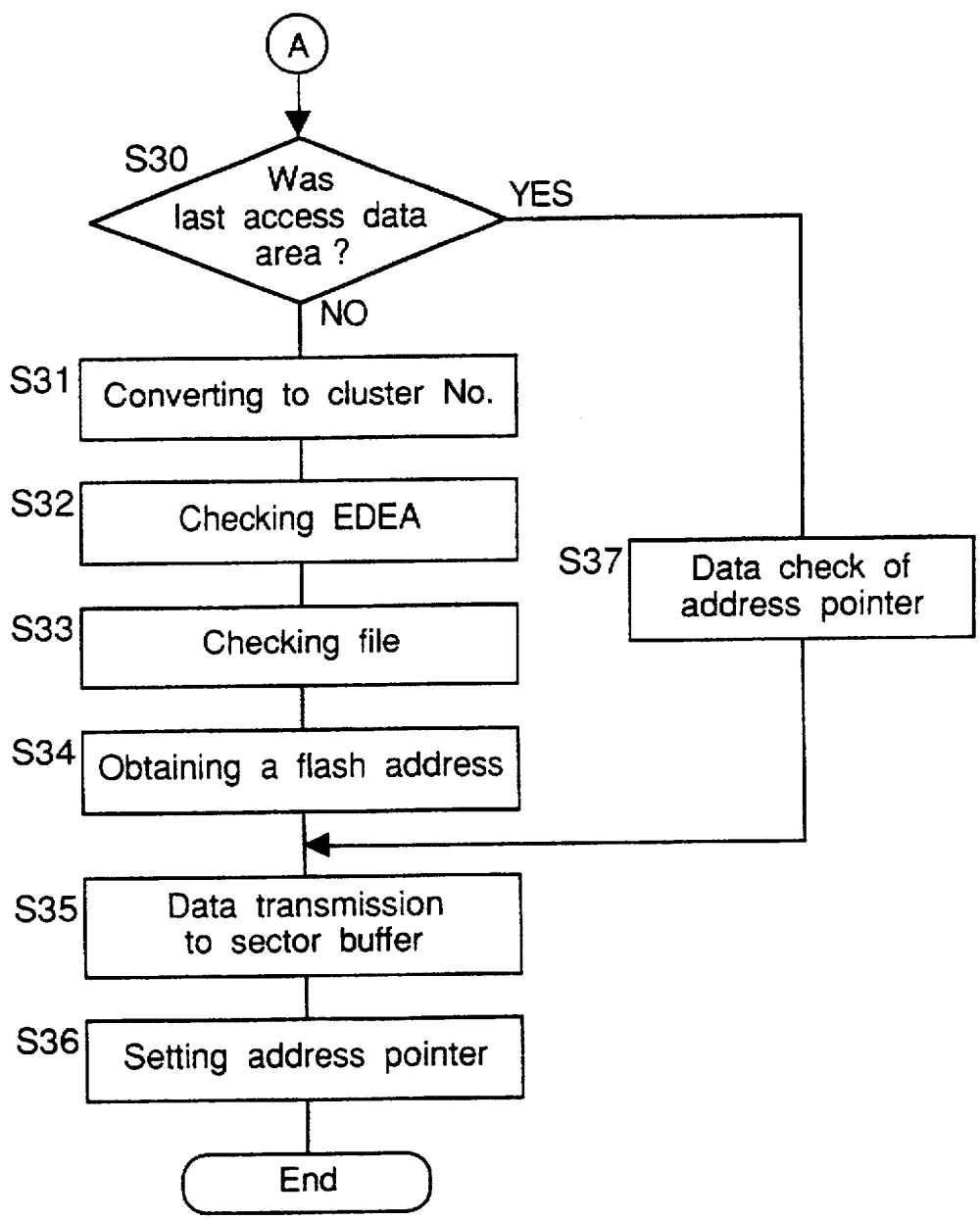
FIG. 9 is a flow chart showing the operation of CPU 102a in reading data.

FIGS. 8 and 9 are flow charts showing the operation of the CPU 102a when it reads data from flash memory 104a. All processes in FIG. 8 and 9 are performed by the CPU 102a unless stated otherwise.

In Step S1 of FIG. 8, the CPU 102a receives an LSA from the host unit 110. In Step S2, the CPU determines, based on the LSA received, whether or not the area for the host unit 110 to access is in the directory entry area of the extended directory entry area. In DOS, the boot area , FAT area, directory entry area, and data area are arranged in this order from the bottom of the addresses of the disk device. Further, the sizes of those areas are determined by the capacity of the disk. Therefore, by checking what the LSA host unit 110 designates, the CPU 102a can find what area the host unit 110 seeks to access.

If the host unit 110 seeks access to the directory entry area (YES) in Step S2, the CPU 102a, in Step S3, performs the offset calculation for the directory entry area to obtain the address. Then, in Step 4 the , CPU 102a requests flash control unit 105 to transfer the data at the address in flash memory 104a to sector buffer 106, and the operation ends.

If the host unit 110 does not seek access to the directory entry area (NO) in Step S2, the CPU 102a, in Step S5, checks to determine whether or not the host unit 110 seeks access to the FAT area based on the received LSA. If it is the FAT area (YES), the operation proceeds to Step S6, wherein the CPU 102a creates an arbitrary number, for example, the incremented starting cluster number of the file, as the FAT data, and has the flash control circuit 105 send the number to sector buffer 106 to complete the operation. This is done because the semiconductor disk device 100a of the present invention does not necessarily use the FAT information to read a desired file due to the fact that data is stored in the continuous area of flash memory 104a.

If the host unit 110 does not seek access to the FAT (NO) in Step S5, the CPU 102a checks, in Step S7, to ascertain whether the host unit 110 seeks access to the data area based on the received LSA. If it is the data area (YES), the operation proceeds to Step S30 of FIG. 9, wherein it checks if the previously accessed area was a data area. If it is not a data area (NO), the LSA is converted to a cluster number in Step S31. Then in Step 32 the CPU 102a checks the extended directory entry area in order to determine whether the desired file to read exists in the flash memory 104a. In Step S33 the CPU 102a obtains the starting cluster number for the desired file to read and checks the file associated with the cluster number. In Step 34, the CPU 102a obtains the starting address of flash memory 104a which corresponds to the file and then proceeds to Step 35.

In Step 35, the data requested by the host unit 110 is transferred to sector buffer 106 from flash memory 104a via the flash control circuit 105, and the read address pointer (not shown) placed in CPU 102a is set to end the operation. The read address pointer is either the address of flash memory 104a at which the next reading starts or the last address that has been read in the previous reading. The pointer is necessary because data is read in units of 512 Bytes and it allows for fast reading. Thus, the CPU 102a obtains the cluster chain information of the file to retrieve and reads the data according to the chain information.

If the previously accessed area was a data area (YES) in Step 30, the operation proceeds to Step S37, wherein the CPU 102a checks the data of the read address pointer, then advances to Step S35, and carries out the process of Step S35 and those steps which follow Step S35. The read address pointer may be placed in the flash control circuit 105.

In Step $7 of FIG. 8, if it is found that host the unit 110 does not seek to access the data area (NO) judging from the LSA, the operation proceeds to Step S8, where the CPU 102a checks to determine, on the basis of the LSA, whether the area the host unit 110 seeks to access is the boot area. If the answer is "YES", the operation proceeds to Step S9, where CPU the 102a has flash control circuit 105 send the data stored in the boot area of flash memory 104a to sector buffer 106 to finish the operation. In Step S8, if the area the host unit 110 seeks to access is not the boot area (NO), the operation proceeds to S10, where a predetermined error process is carried out because the CPU has failed to find an ID to finish the operation.

Figure 10:
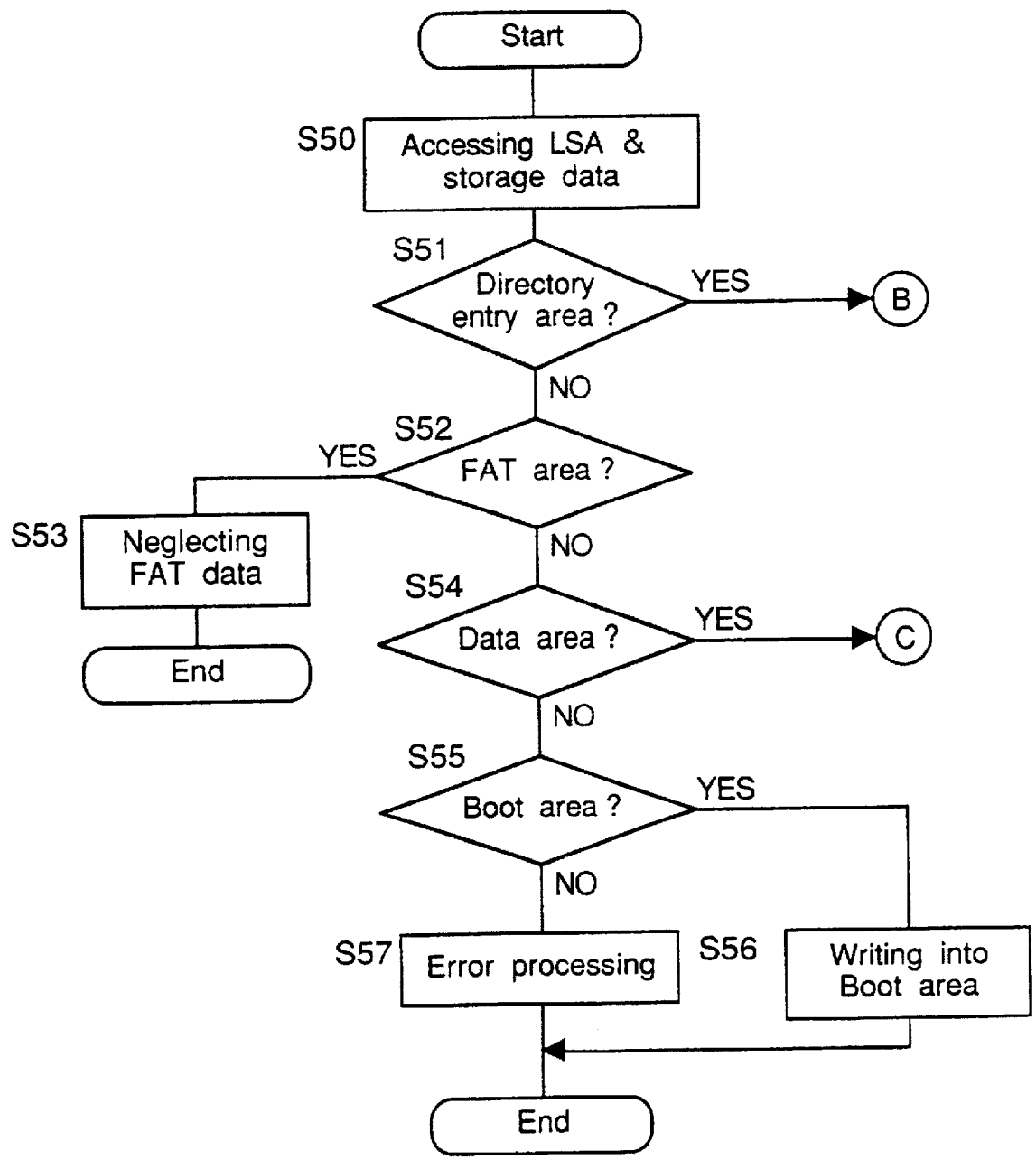
FIG. 10 is a flow chart showing the operation of CPU 102a in writing data.
Figure 11:
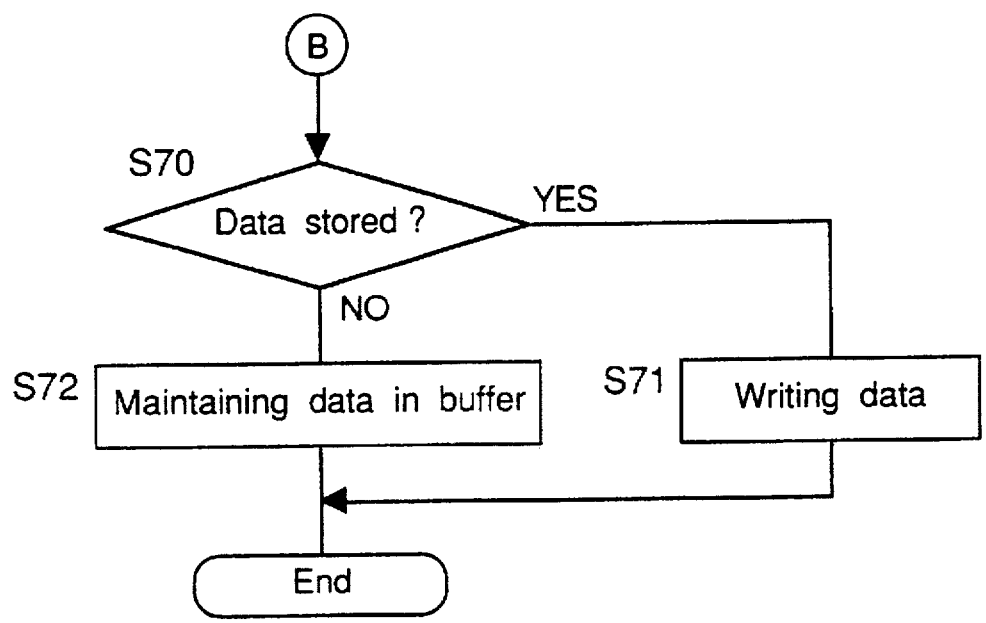
FIG. 11 is a flow chart showing the operation of CPU 102a in writing data.
Figure 12:
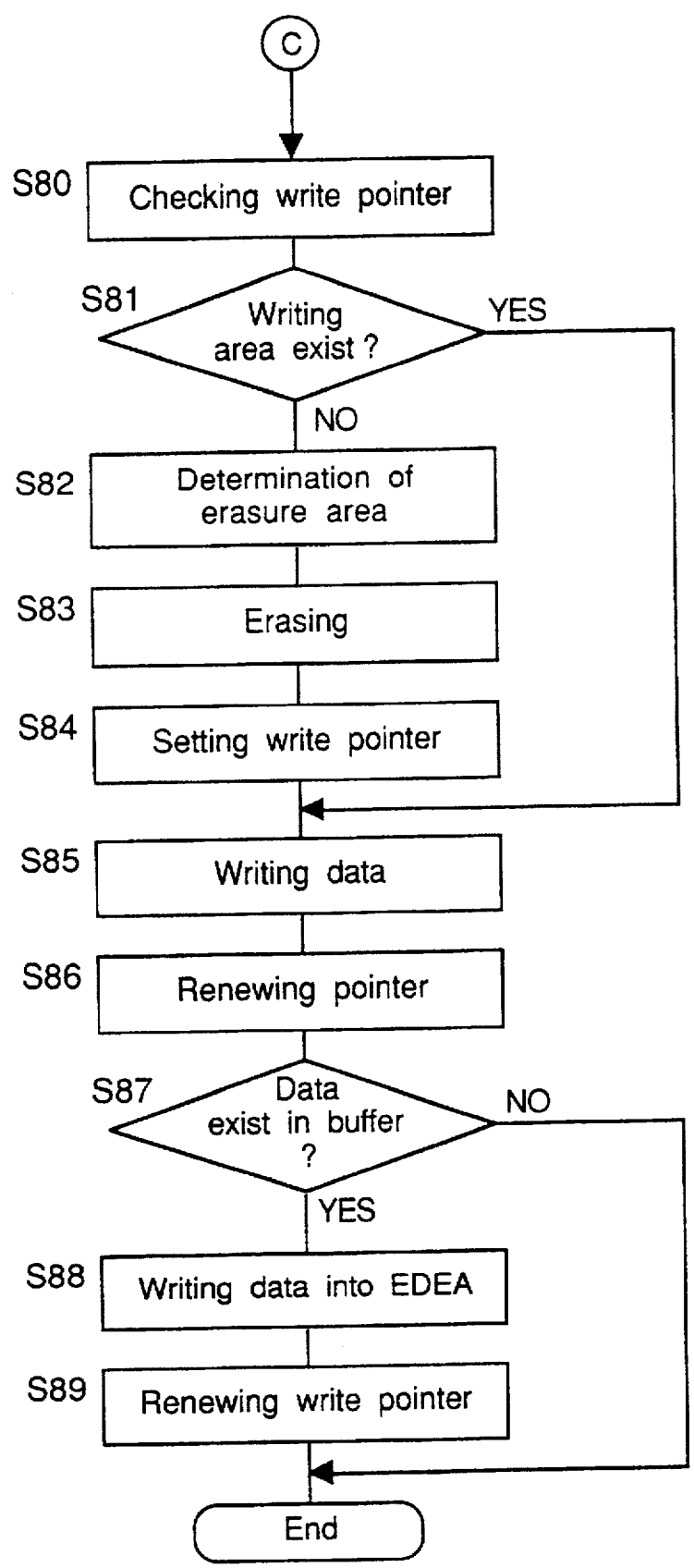
FIG. 12 is a flow chart showing the operation of CPU 102a in writing data.

FIGS. 10, 11, and 12 are flow charts showing the operation of the CPU 102a when it writes data to the flash memory 104a. In these figures all the processes are performed by the CPU 102a unless stated otherwise.

In Step S50, the CPU receives from the host unit 110 an LSA and the data to be stored in the flash memory 104a. In Step S51, the CPU determines, based on the LSA received, whether or not the area for the host unit 110 to store the data is in the directory entry area of the extended directory entry area. If it is the directory entry area (YES), the operation proceeds to Step S70 of FIG. 11. In Step S51, as in Step S2 in FIG. 8, the CPU 102a can find what area the host unit 110 seeks to access by checking the LSA host unit 110 designates.

In Step S70 of FIG. 11, the CPU checks to determine whether the file data that corresponds to the data to be stored in the directory entry area of the extended directory entry area already exists in the data area of flash memory 104a. If the file data exists (YES), the operation proceeds to Step $71, where the CPU has flash control circuit 105 write the data to be stored in the directory entry area of flash memory 104a through sector buffer 106 and ends the operation. This process corresponds to the case where file data to be stored in the flash memory 104a is sent to the flash memory 104a from host unit 110 and is stored therein and then data concerning the file data is sent to the directory entry area.

In Step S70, if the file data that corresponds to the data to be stored in the directory entry area of the extended directory entry area does not exist in the data area of flash memory 104a (NO), the operation proceeds to Step S72, where the CPU sends to sector buffer 106 the data to be stored in the directory entry area through flash control circuit 105 and ends the operation. This process corresponds to the case where file data to be stored in flash memory 104a is sent after the data, about the file data and to be stored in the directory entry area, is sent from the host unit 110.

In Step S51 of FIG. 10, if the area for the host unit 110 to store the received data is not in the directory entry area of the extended directory entry area (NO), the CPU determines, in Step S52, whether or not the area for storing the received data is in the FAT area. If it is in the FAT area (YES), the operation proceeds to Step S53, where the CPU disregards the received data and ends the operation. This process results from the fact that the semiconductor disk device of the present embodiment does not employ a FAT and hence can disregard the data requested to be written in a FAT. If one needs to keep the FAT data, it may be stored in the area following the extended directory entry area being used.

In Step S52, if the area for storing the received data is not in the FAT area (NO), the CPU checks whether or not the area for storing the received data is the data area (Step 54). If it is the data area (YES), the operation moves to Step S80 shown in FIG. 12.

In Step S80 shown in FIG. 12, the CPU 102a checks the write address pointer for the flash memory placed therein (not shown). In Step S81, the CPU determines whether or not there is an empty area in flash memory 104a in which the data is to be written. If there is no empty area (NO), the CPU selects areas to erase data from in flash memory 104a in Step S82 and erases them in Step S83. This erasure operation is performed on the memory areas from which data is no longer needed and before there is no area left to be written into in the flash memory 104a. The reason for existence of erasable areas is that, when data in flash memory 104a is updated, the data must be moved to an empty area in flash memory 104a.

If an erasure block of flash memory 104a does not include valid data, the entire block is erased. If the erasure block contains valid data, however, only the valid data is moved to an empty, writable area in flash memory 104a, and then the entire block is erased. When the size of the data to be stored in flash memory 104a is too large to store in a single continuous area and the data must be written in multiple separate areas, one may start erasing and writing the data beginning in the area with the lowest possible address and moving upward in order to optimize the memory efficiency of flash memory 104a. Because it is expected to take a long time to complete this process, the semiconductor disk device is designed to perform this process in the background while it is in a ready state.

Further, when multiple, separate, writable areas must be used for writing data, one may store the address of flash memory 104a for each discontinuous file in the area following the directory entry area in the extended directory entry area as in the FAT. In this case, however, each continuous area of flash memory 104a is larger than the areas the conventional FAT manages. Therefore, a smaller area is necessary for storing the addresses.

Next, in Step S84, the write address pointer is set for flash memory 104a. In Step S85, the data is written and stored in the area in flash memory 104a, which the write address pointer designates, through flash control circuit 105 and sector buffer 106. In Step S86, the write address pointer is updated. In Step S87, the CPU checks to determine whether or not sector buffer 106 includes the data to be written in the directory entry area. If there is data (YES), the data in sector buffer 106 to be written in the directory entry area and the starting address for the data written in flash memory 104a in Step S85 are written in the extended directory entry area of flash memory 104a in Step S88. Finally, in Step S89, the write address pointer is updated to finish the operation.

In Step S81, if there is an empty area in flash memory 104a for writing (YES), the operation proceeds to Step S85 and carries out the processes thereafter. In Step S87, if sector buffer 106 does not include the data to be written in the directory entry area, the operation ends.

Referring back to Step S54 in FIG. 10 if the area for storing the received data is not the data area (NO), the CPU determines whether or not the area for storing the received data is the boot area (S55). If it is the boot area (YES), the operation proceeds to step S56, where the data is written in the boot area of flash memory 104a through flash control circuit 105 and sector buffer 106 and then the operation ends. In Step S55, if the area to store the received data is not the boot area (NO), the operation proceeds to S57, where the predetermined error process is carried out because the CPU has failed to find an ID, and the operation ends.

As described above, since the semiconductor disk device of the present embodiment neither manages, writes, nor reads data by a sector of 512 Bytes, the data area is not divided into units of 512 Bytes but remains continuous. Every time a data file is stored continuously, the extended directory entry area that stores the data for the directory entry area of each data file stored in the flash memory and its starting address, is provided and updated in the data storage area continuously following the area storing the data file. Thus, the semiconductor disk device can maintain interface compatibility with DOS and manage the continuous data sent from the host unit without using a FAT.

In the present embodiment the FAT data from host unit 110 is disregarded. However, the FAT data may be preserved in an area provided right after the extended directory entry area. This FAT area is provided and updated, as the extended directory entry area, every time a data file is continuously stored in the data storage area.

Thus, the present invention encompasses various modifications. It should be understood that the embodiments described above have been presented by way of examples only, and not limitation. Thus, the breadth and scope of the present invention should be defined only in accordance with the following claims and their equivalents.

As described above, the semiconductor disk device of the present invention has an interface compatible with the host unit operating in the DOS environment, identifies the type of data sent from the host unit using the LSA also sent from the host unit, and reads data from and writes data to continuous areas in the main memory. This configuration provides data management suitable for the flash memory and hence allows for more efficient data management than the exact simulation of the magnetic memory device operating under DOS. Therefore, this invention facilitates the supply of low cost semiconductor disk devices having large memory capacities.

As mentioned above, every time a data file is stored in the main memory, the extended directory entry area that stores the data for the directory entry area of each data file stored in the main memory and its starting address is provided and updated in the area continuously following the area storing the data file. Thus, the data stored in the main memory can be read and written without using a FAT. Therefore, this invention eliminates the conversion table and facilitates the supply of low cost semiconductor disk devices of large memory capacity.

In this configuration the directory entry data is stored in the extended directory entry area before the starting address is stored. Thus, this configuration allows the extended directory entry area to be retrieved according to the procedures of the DOS environment and also provides data management suitable for the flash memory.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A semiconductor disk device comprising:

interface means for connecting the semiconductor disk device to a host unit transferring data in sector units;

a main memory comprising a flash memory including at least one continuous data storage area for storing data, the data storage area having addresses from a lowest address to a highest address;

control means for controlling input/output of data between the host unit and said main memory through said interface means and for address, data, and memory management of said main memory, said control means identifying a data file received from the host unit from a logical sector address sent with the data file from the host unit and writing the data file received from the host unit in the continuous data storage area of said main memory continuously, beginning at a starting address of the continuous data storage area having the lowest address where no data is stored in the continuous data storage area, providing in the continuous data storage area an extended directory entry area immediately following each data file written into the continuous data storage area, writing a directory entry file associated with a data file continuously in the extended directory entry area beginning at a starting address immediately following the highest address of the data file, and reading data from the continuous data storage area; and cache memory connected to said control means and accessible to said main memory through said control means.

2. The semiconductor disk device of claim 1, wherein said control means writes a directory entry file in the extended directory entry area before storing the starting addresses of the directory entry file and of the associated data file in the directory entry file.

3. A method of memory management for semiconductor disk devices using a flash memory as a main memory, the method comprising:

providing a continuous data storage area in a main flash memory for storing data; and identifying a data file received from a host unit transferring data in sector units, using a logical sector address sent from the host unit, writing the data file received from the host unit in the continuous data storage area of said main memory continuously, beginning at a starting address of the continuous data storage area having the lowest address where no data is stored in the continuous data storage area, providing in the continuous data storage area an extended directory entry area immediately following each data file written into the continuous data storage area, writing a directory entry file associated with a data file continuously in the extended directory entry area beginning at a starting address immediately following the highest address of the data file.

4. The method of memory management of claim 3, comprising writing a directory entry file in the extended directory entry area before storing the starting addresses of the directory entry file and of the associated data file in the directory entry file.

* * * * *